United States Patent [19]

Ludington et al.

[11] Patent Number: 4,618,212

[45] Date of Patent: Oct. 21, 1986

[54] OPTICAL FIBER SPLICING USING LEAKY MODE DETECTOR

[75] Inventors: Paul D. Ludington, Norcross; Ian A. White, Roswell, both of Ga.

[73] Assignee: AT&T Bell Laboratories, Murray Hill, N.J.

[21] Appl. No.: 615,283

[22] Filed: May 30, 1984

[51] Int. Cl.$^4$ .......................... G02B 6/38; G02B 6/00
[52] U.S. Cl. ............................... 350/96.21; 350/96.20; 350/96.15
[58] Field of Search ............... 350/96.15, 96.16, 96.20, 350/96.21

[56] References Cited

U.S. PATENT DOCUMENTS

| | | | |
|---|---|---|---|
| 4,368,543 | 1/1983 | Hasegawa | 350/96.15 X |
| 4,475,789 | 10/1984 | Kahn | 350/96.15 |

FOREIGN PATENT DOCUMENTS

| | | | |
|---|---|---|---|
| 0021091 | 7/1981 | European Pat. Off. | 350/96.20 |
| 54-138452 | 10/1979 | Japan | 350/96.21 |
| 54-151455 | 11/1979 | Japan | 350/96.15 |

OTHER PUBLICATIONS

"Guiding Properties of Fibers", S. E. Miller and A. G. Chynoweth, *Optical Fiber Telecommunications*, 1979, pp. 37-100.
"Axis-Alignment Method for Arc-Fusion Splice of Single-Mode Fiber Using a Beam Splitter", K. Imon and M. Tokuda, *Optics Letters*, vol. 8, No. 9, Sep. 1983, pp. 502-503.
"Monitoring Method for Axis Alignment of Single-Mode Optical Fiber and Splice-Loss Estimation", T. Haibara et al., *Optics Letters*, vol. 8, No. 4, Apr. 1983, pp. 235-237.
"New Optical Monitoring Method for Arc-Fusion Splice of Single-Mode Fibres and High-Precision Estimation of Splice Loss", Y. Kato et al., *Electronics Letters*, vol. 18, No. 22, Oct. 1982, pp. 972-973.
"Integrating Cube Scattering Detector", A. R. Tynes, *Applied Optics*, vol. 9, No. 12, Dec. 1970, pp. 2706-2710.
*Technical Digest of Arc Fusion Splicer for Single-Mode Fiber Model FSM*-04S, T. Arai et al., Jun. 1983.
"Simple, Low-Loss Joints Between Single-Mode Optical Fibers", C. G. Someda, *Bell System Technical Journal*, vol. 52, No. 4, Apr. 1973, pp. 583-596.
"Core Alignment Procedure for Single-Mode-Fibre Jointing", C. M. De Blok et al., *Electronics Letters*, vol. 20, No. 3, pp. 109-110, Feb. 2, 1984.

*Primary Examiner*—William L. Sikes
*Assistant Examiner*—Akm E. Ullah
*Attorney, Agent, or Firm*—Eugen E. Pacher

[57] ABSTRACT

Optical fiber splicing method and apparatus. The method comprises aligning the ends of the fibers to be spliced by a procedure comprising coupling radiation into one of the fibers, the transmitting fiber, stripping nonfundamental mode radiation from the other fiber, the receiving fiber, and detecting the stripped radiation in such a manner that a substantial fraction of the detected radiation is lowest order nonfundamental mode ($LP_{11}$) radiation for at least some relative position of the fiber ends. By adjusting the relative position of the fiber ends to minimize the detected power, the fibers are aligned. The procedure not only permits accurate alignment but can also be used to determine the splice loss. Apparatus for the practice of the method is also disclosed.

14 Claims, 4 Drawing Figures

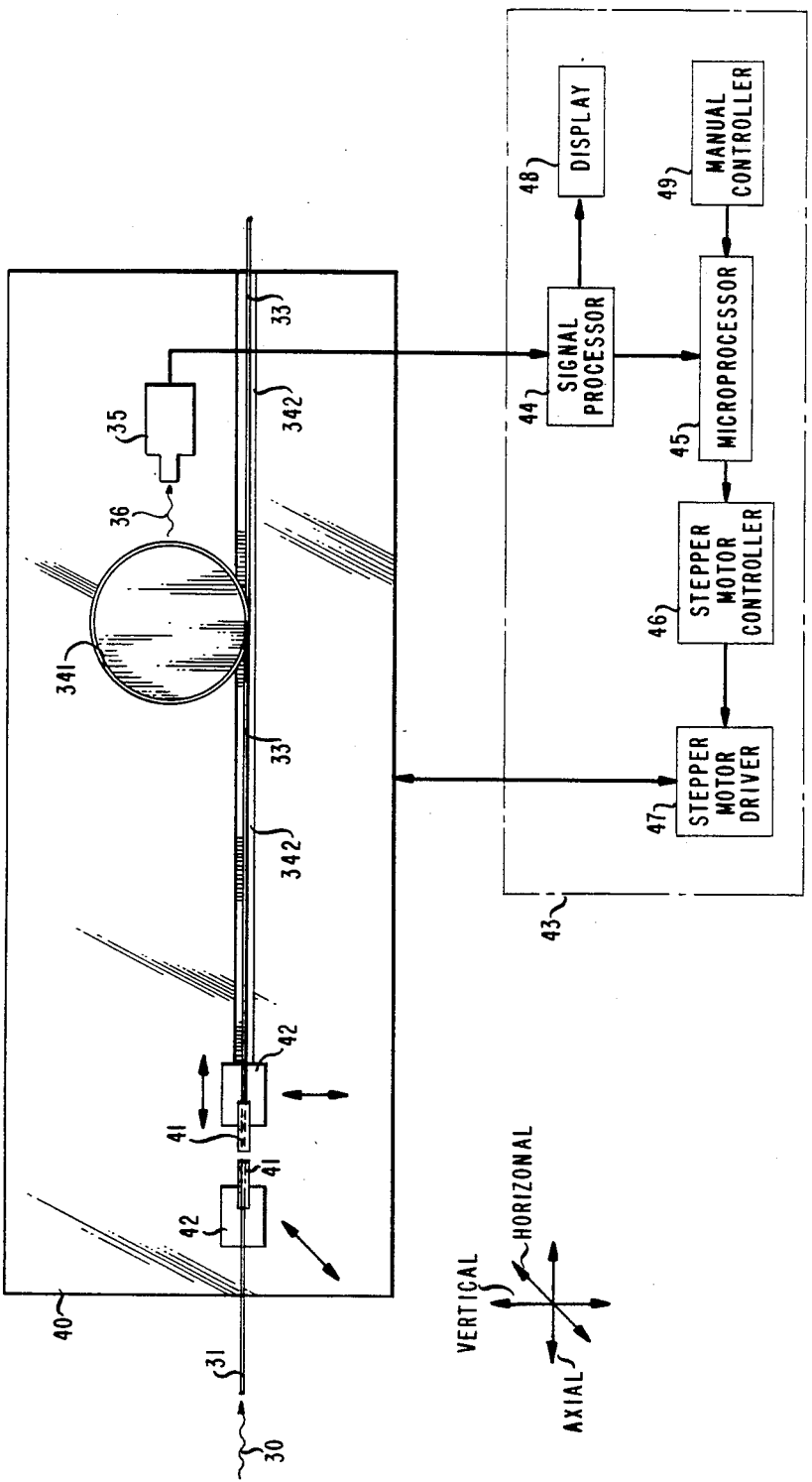

OPTICAL FIBER SPLICING USING LEAKY MODE DETECTOR

FIELD OF THE INVENTION

This invention pertains to a method and apparatus for optical fiber splicing, and to fiber spliced thereby.

BACKGROUND OF THE INVENTION

The capability to form low loss joints between lengths of optical fibers is a basic requisite for the production of fiber communications systems. Such systems, and the underlying theory, are well known and will not be reviewed here. See, for instance, *Optical Fiber Telecommunications*, S. E. Miller and A. G. Chynoweth, editors, Academic Press, 1979, incorporated herein by reference; in particular, chapter 3, pp. 37-100 therein.

Two types of fiber connections have been developed, one typically being used where relatively frequent connection/disconnection is anticipated, the other is typically being used where this is not the case, and where extremely low loss is important. The latter, usually referred to as a splice, is the type of connection that is the concern of this application.

Currently, there are two general categories of optical fiber splices: fusion splices and butt joint splices. In fusion splices, the ends of two optical fibers are aligned, brought together, and the ends melted by a flame, electric arc, etc., in order to join the ends. In butt joint splices, the ends are aligned, and the fiber ends fixed in the aligned position by means of an appropriate bonding material or mechanical fixture.

Splicing of optical fibers, especially of single mode fibers, requires that the fiber cores be very accurately aligned. Since the core is not always concentric with the outer fiber surface to the necessary accuracy, high precision alignment generally cannot rely on the registry of the fiber surfaces, and techniques for monitoring the relative position of the two fiber cores had to be developed.

The prior art knows a variety of alignment techniques, including alignment using visual observation of the core (e.g., K. Imon and M. Tokuda, *Optics Letters*, Vol. 8, page 502 (1938); and T. Haibara et al, *Optics Letters*, Vol. 8, page 235 (1983)) and techniques that comprise sensing of the transmitted or scattered power.

The latter techniques, which can use some form of feedback to control positioning of the cores, include methods that monitor transmitted fundamental mode power, i.e., the power coupled into the receiving fiber and propagating therein in the fundamental fiber mode. This power can be monitored at the far end of the receiving fiber, or it can be monitored locally by stripping some fundamental mode power from the fiber. See Y. Kato et al, *Electronics Letters*, Vol. 18, page 972 (1982). The former approach is disadvantageous because, inter alia, a signal has to be transmitted back to the splice site. The latter approach, although not subject to that shortcoming, suffers from the inherent drawback that it requires seeking a maximum in the transmitted power, and thus is generally less sensitive than alignment techniques that use radiation scattered from the splice. Furthermore, the fundamental mode technique often necessitates use of radiation of wavelength longer than the operating wavelength of the fiber for alignment. Thus this technique often cannot be used to determine the splice loss at the operating wavelength.

The prior art techniques that use scattered power passively collect scattered radiation by placing a detector or waveguide in the vicinity of the receiving fiber end. See, for instance, A. R. Tynes, *Applied Optics*, Vol. 9, page 2706 (970). U.S. patent application Ser. No. 367,120, co-assigned with this, discloses a technique for fiber splicing that comprises the use of a waveguide to collect radiation emitted from the receiving fiber near the splice and to transmit the collected radiation to a detector. This and other techniques that passively collect radiation scattered from the splice or near-splice regions of the receiving fiber can typically not easily be made to discriminate between different higher order modes, resulting in a relatively complicated detected power profile as a function of core offset. This in turn complicates the determination of the splice loss, requiring use of a calibration procedure. Furthermore, such techniques typically require apparatus having relatively fragile radiation collecting and/or guiding means, and thus often are not well suited for field application.

In view of the importance of the capability for reliably and conveniently making very low loss splices in optical fiber, especially single mode fiber, and for reliably measuring the splice loss, a splice technique that comprises a sensitive and convenient technique for accurately aligning fiber cores, that uses relatively rugged, field-worthy apparatus and that also has the ability to accurately locally determine the splice loss, is of considerable interest. This application discloses such a splice technique, and apparatus for the practice thereof.

GLOSSARY OF TERMS

An "optical fiber" is a filamentary dielectric body comprising a region of relatively high refractive index, the core, surrounded by a region of relatively low refractive index, the cladding. The structure typically is optimized to guide visible or infrared radiation (e.g., between about 0.6 and about 2 $\mu$m, and possibly even longer wavelengths) and to have low loss for radiation of the design wavelength.

A "single mode" optical fiber herein is a fiber that is operated at a wavelength above the fundamental cut-off wavelength of the fiber.

"Higher order mode" radiation, also referred to as "nonfundamental mode" radiation or "leaky mode" radiation, is all radiation in single mode fiber that is not fundamental mode radiation. The lowest higher order mode is designated $LP_{11}$. In single mode fiber, higher order modes are not guided, and therefore are relatively rapidly attenuated, including attenuation by leakage or radiation from the fiber.

"Stripping" higher order modes from an optical fiber herein implies deliberate action to change the propagation properties of the fiber in such a way as to increase the rate at which higher order mode power is removed from the fiber in a predetermined fiber region. The preferred stripping technique comprises introducing a bend of appropriate radius into the fiber.

SUMMARY OF THE INVENTION

Disclosed is a method of splicing single mode optical fiber. The fibers to be spliced are arranged in the usual fashion, substantially collinear, with the splice ends of the fibers in proximity, typically with a few micron gap therebetween. Single mode radiation, coupled into the "transmitting" fiber, is emitted from the splice end of the transmitting fiber and coupled into the splice end of the "receiving" fiber, and propagates away from the splice. At an intermediate position in the receiving fiber, radiation is stripped from the fiber by appropriate means, and some of the stripped radiation is detected by means of a local radiation detector. Stripping means and detector are arranged such that the stripped radiation consists substantially of nonfundamental mode radiation. A significant fraction of the detected radiation power, preferably at least 90% for small core offsets, is contributed by the $LP_{11}$ mode, resulting in relatively simple profiles of detector output vs. offset, thus facilitating automatic alignment as well as splice loss determination.

Disclosed is also apparatus for the practice of the inventive method. The apparatus comprises fiber holding means, fiber translation means, radiation stripping means, and radiation detection means, with the radiation stripping means adapted to stripping substantially only nonfundamental mode radiation from the receiving fiber.

BRIEF DESCRIPTION OF THE DRAWINGS

FIG. 4 schematically shows preferred apparatus for the practice of the invention.

Analogous features in different drawings are identified by the same numeral.

DETAILED DESCRIPTION

A central feature of the inventive method is active removal (stripping) of higher order mode radiation from the receiving fiber, and use of stripped radiation in the alignment procedure.

Figure 1:
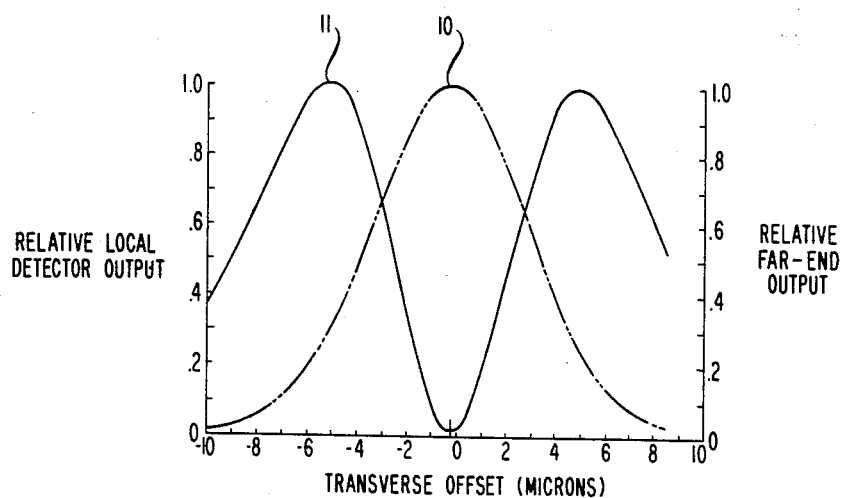
FIG. 1 shows the power detected at the far end of a receiving fiber, and the power detected by a local detector according to the invention, stripped from the same fiber, both as a function of offset.

Coupling two single mode fibers typically results in the excitation of higher order modes in the receiving fiber, even if the radiation arriving at the splice end of the transmitting fiber is purely $LP_{01}$ radiation. This is due, inter alia, to geometric imperfections in the coupling region, including transverse offset between the core regions, angular tilt of one fiber relative to the other, longitudinal separation between the fiber ends, and mismatch in the fundamental mode spot size. When the fiber cores are optimally aligned, the production of higher order modes is minimized, while the fundamental mode transmission is maximized. This is illustrated in FIG. 1, which shows, as a function of transverse offset, the relative fundamental mode power 10 and the relative higher order mode power 11, primarily $LP_{11}$ for small offsets. Curve 10 was determined by measuring the power arriving at the far end of the (about 1 km long) receiving fiber, whereas curve 11 was determined locally, the radiation emitted about 3 inches from the near end of the receiving fiber.

Figure 2:
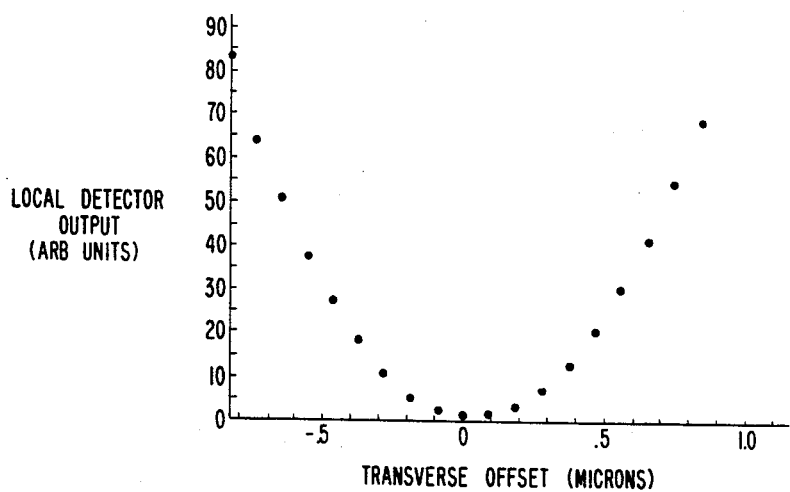
FIG. 2 shows the power detected by a local detector according to the invention, as a function of offset.

FIG. 2 shows a typical local detector output trace as a function of transverse offset. The radiation was stripped from the receiving fiber in such a manner that the detector input radiation contained substantially no fundamental mode ($LP_{01}$) radiation, with lowest nonfundamental mode ($LP_{11}$) radiation greatly predominating in the detector input radiation at small (typically less than $\pm 3$ $\mu$m) offsets. Although the inventive method can be practiced even if modes higher than $LP_{11}$ are a substantial fraction of the detector input, $LP_{11}$ is advantageously a significant fraction of the input radiation, preferably at least 90%, for small offsets. Under these circumstances the detector input intensity (and thus the detector output signal) is approximately parabolic with respect to offset, which allows convenient and accurate splice loss determination.

Figure 3:
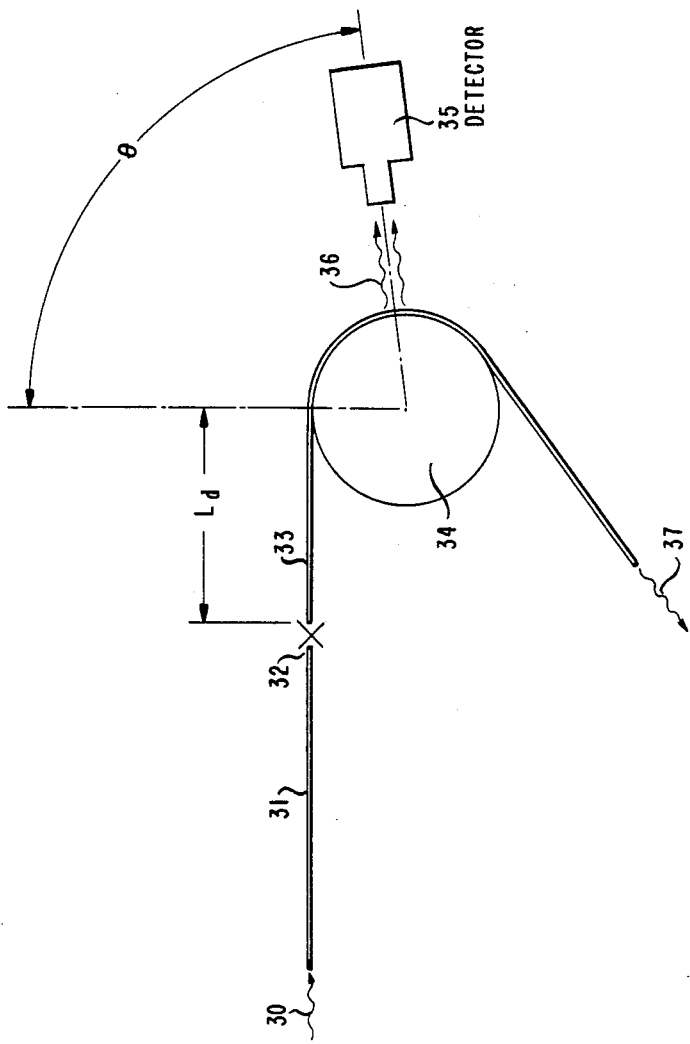
FIG. 3 schematically depicts the splice region of apparatus according to the invention.

FIG. 3 schematically shows a preferred method for coupling radiation from the receiving fiber. When the receiving fiber is appropriately bent, such as by wrapping around a mandrel, light is tapped out due to macrobending. In an ideal bent waveguide, this light is radiated tangentially to the bend axis and is confined to the plane of the bend. However, due to the roughness of the protective outer coating of a real fiber, the radiation is scattered and appears to radiate diffusely from the fiber.

Fundamental mode radiation 30 travels in transmitting fiber 31 towards the splice 32, where it is emitted from 31, with part of the emitted radiation being coupled into receiving fiber 33 as fundamental mode radiation 37, and part as higher order mode radiation 36. Appropriate mode-stripping means (e.g., a cylindrical mandrel 34, with the receiving fiber wrapped around the mandrel), placed an appropriate distance $L_d$ from the splice, cause predominantly $LP_{11}$ radiation to enter detector 35. This is a consequence of the fact that the effective attenuation of higher order modes increases with increasing mode number, with the $LP_{11}$ mode thus being the least attenuated and most strongly guided higher order mode, and of the fact that higher order modes, including the $LP_{11}$ mode, can be stripped from the fiber substantially without disturbing the fundamental mode. Thus the distance $L_d$ between splice and mode stripping means, the bend radius of the fiber, and the wrap angle $\theta$ of the fiber, e.g., the angle from the point of initial tangency of the fiber with the mandrel to the effective emission region of the fiber, are significant parameters in the practice of the invention. The most advantageous values of these parameters depend on the fiber and, typically, the wavelength of the radiation, as will be appreciated by those skilled in the art. For a particular silica-based fiber (125 $\mu$m OD, 8.3 $\mu$m core diameter, 58 $\mu$m deposited depressed index cladding diameter, $\Delta^+ = 0.26\%$, $\Delta^- = 0.11\%$), we have found the following parameters to yield satisfactory results: 1.25 inch bend radius, $L_d$ about 3 inches, $\theta$ about 60°. We consider that for most cases the distance between splice and start of the fiber bend will be between about 0.25 and about 10 inches, and the bend radius be between about 0.4 inches and about 1.5 inches. In determining an acceptable lower limit on the bend radius, it is typically necessary to consider the bending strength of the fiber. For instance, the above-described fiber having $5.10^4$ psi proof strength, the minimum allowable bend radius would be about 0.5 inches.

Although wrapping a fiber around a mandrel can be a very convenient and effective way to strip higher order modes from a fiber, it is not the only technique that can produce the desired detector input radiation, as will be appreciated by those skilled in the art. For instance, the fiber can be confined within an appropriately shaped structure, e.g., a circular cutout, wherein, it is forced against the perimeter of the cutout due to the elasticity of the fiber.

After stripping the nonfundamental mode radiation from the receiving fiber, the appropriate stripped radiation is detected by any appropriate means, e.g., a Ge photodetector. As was pointed out before, for small offsets the detected radiation is predominantly $LP_{11}$ mode radiation. The small-offset condition can generally easily be met, since a preliminary coarse alignment typically can produce offsets of 3 μm or less. The detector output signal can be displayed or used otherwise to change the relative core positions, in response to the detector signal, typically by changing the relative position so as to decrease the detected signal power, until a minimum is obtained.

This alignment procedure, and apparatus useful for aligning single mode optical fiber, will now be further discussed with reference to a particular and preferred embodiment of the invention, schematically depicted in FIG. 4.

The apparatus comprises a substantially mechanical portion 40 and a substantially electrical portion 43. The former comprises means 42 for controllably altering the position of one fiber end with respect to the other fiber end. Since the cores of single mode fibers typically must be aligned to within a fraction of a micron, if a low loss splice (e.g., loss less than about 0.1 dB) is desired, high precision positioning means are typically required. We have found that commercially available micropositioners can be used advantageously.

Because of its small diameter, optical fiber is difficult to manipulate, and known procedures are usually adopted to alleviate the problem. Typically, the fiber coating is removed from a section of the transmitting fiber 31 near the end to be spliced, the fiber inserted into an appropriate ferrule, e.g., a short length of capillary glass tube, and fixed therein, e.g., by means of UV-curable adhesive. After removing the fiber portion that is protruding from the ferrule and preparing the surface to be mated, the fiber terminus 41 is mounted in a terminus chuck 42 or other appropriate holding means attached to a micropositioner (not shown). A terminus chuck can be of conventional design. The receiving fiber 33 is similarly prepared and mounted, led through groove 342 into circular cutout 341, looped inside the cutout, and led therefrom through the continuation of 342. Detector 35 is positioned adjacent to the bent fiber portion, and radiation 30, typically but not necessarily of the intended operating wavelength of the fiber communication system is coupled into the transmitting fiber. The fiber ends are then coarsely aligned. The alignment can be completed manually, or feedback-controlled automatic means can serve to find the position of minimum detected radiation. At an appropriate point during the alignment procedure index matching means, e.g., UV-curable cement having the appropriate refractive index value, can be introduced into the splice region. After completion of the alignment the fiber ends are spliced by known techniques, e.g., bonded or fused.

In exemplary preferred apparatus according to the invention, mechanical terminus chucks 42 are attached to stepper motor stages (Klinger Scientific Corp., Richmond Hill, N.Y., No. UT 50.20PP), with the transmitting fiber terminus movable horizontally, and the receiving fiber terminus movable vertically. The gap between fiber termini is adjustable by means of a hand-controlled micropositioner (Lansing Research Corp., Ithaca, N.Y., No. 20.128). The 1.25 inch diameter cutout 341 is about 3 inches from the splice, and the detector (Judson Infrared Inc., Montgomery, Pa., 5 mm Ge diode No. J16-8) is arranged such that $\theta = 90°$. Subassembly 40 also comprises known components that are not shown in FIG. 4, e.g., a microscope used to view the splice, and a LED to backlight the splice region for better viewing.

Subassembly 43 comprises signal processor 44 which receives the output of detector 35. As is well known in the art, phase-sensitive detection has many advantages over DC detector methods, and the exemplary preferred apparatus described here uses an AC signal. In particular, radiation 30 is 1.3 μm radiation from a laser diode, square-wave modulated at 2 kHz. Signal processor 44 comprises an amplifier tuned at 2 kHz and an A/D converter (Intersil 7109, Intersil Inc., Cupertino, Calif.). Such components are well known in the art and need no detailed discussion. The (digital) output of 44 is fed to the microprocessor sub-unit 45, which comprises an Intel 8748 microprocessor (Intel Corp., Santa Clara, Calif. Stepper motor driver 47 controls the movements of the two 0.1 μm stepper motor stages, and is in turn controlled by stepper motor controller 46. Both 47 and 46 can be commercial units (e.g., Klinger Scientific CC1.2). Controller 46 receives the output of 45. During the coarse adjustment phase, the horizontal and vertical movements of the fiber ends are operator controlled by means of manual controller 49. Upon achievement of acceptable coarse adjustment, verifiable by means of signal display 48, the unit can be switched into an automatic alignment mode, in which the microprocessor causes the fibers to be moved to the position of minimum detected signal. Algorithms capable of finding a position of core alignment are known in the art. See, for instance, T. Arai et al, *Technical Digest of Arc Fusion Splicer for Single-Mode Fiber*, Model FSM-045, (distributed by Fujikura Ltd., at IOOC, Tokyo, Japan, June 1983).

The inventive method, and, in particular, the preferred apparatus for the practice thereof, permit local determination of the loss of a splice, an example of which will now be discussed.

At the position of minimum detected power the core offset typically is negligible, and essentially all splice loss is due to other factors, e.g., tilt, longitudinal separation between fiber ends, and mismatch in the fundamental mode field radius. Thus the detector signal $P_1$ at the minimum position is proportional to the intrinsic loss $D_0$ of the optimally aligned splice.

$$P_1 = D_0 P_{inc} \Gamma_1 e^{-\alpha_1 L_d},$$

where
$P_1$ = detected power at optimal alignment,
$P_{inc}$ = power incident at the splice,
$\Gamma_1$ = tapping efficiency of the mode stripper (e.g., mandrel) for the $LP_{11}$ mode,
$\alpha_1$ = straight fiber attenuation for $LP_{11}$ mode, and
$L_d$ = splice-to-mandrel distance.

Offsetting the fibers by a known small amount (typically less than about 3 μm) and noting the detected power $P_2$ allows determination of the intrinsic loss of the splice, since, to a good approximation, $$P_2 = [D_0 + (r_0/w_0)^2] P_{inc} \Gamma_1 e^{-\alpha_1 L_d},$$

with
$r_0$ = the known fiber offset, and
$w_0$ = the mode field radius of the fiber, a quantity that in production fiber is typically controlled to within a few percent.

Thus $$P = P_1/P_2 = D_0[D_0 + (r_0/w_0)^2]^{-1},$$

and $$L_i(\text{dB}) = 4.34(r_0/w_0)^2[P(1-P)^{-1}]$$

is the loss of the index-matched optimally aligned splice.

Since splice formation, i.e., bonding or fusion, may introduce some additional loss, due to surface-tension-caused misalignment, core deformation, etc., a measurement of detected power after splice formation may yield a value $P_3 \neq P_1$. The final splice loss value is then $$L_f(\text{dB}) = (P_3/P_1)L_1.$$

Apparatus according to the invention has been used to routinely produce splices having less than 0.1 dB splice loss. The mean of one series of 101 splices was 0.022 dB, with a standard deviation of 0.029 dB. The inventive method allows for much greater accuracy in splice loss determination than is possible with prior art systems, e.g., far-end power monitoring, and is relatively insensitive to variations in individual fiber parameters, unlike direct calibration procedures.

What is claimed is:

1. Method for splicing a first optical fiber to a second optical fiber, the first and second optical fibers being single mode optical fibers at a predetermined wavelength, the first fiber having a first fiber splice end, the second fiber having a second fiber splice end and a second fiber far end, the method comprising
   (a) placing the first fiber splice end in proximity with the second fiber splice end,
   (b) directing electromagnetic radiation of the predetermined wavelength through at least a part of the first fiber such that substantially all of the radiation arriving at the first fiber splice end is fundamental mode radiation, with the arriving radiation being emitted from the first fiber splice end, with at least a part of the emitted radiation being coupled into the second fiber splice end,
   (c) stripping radiation from the second fiber at a fiber region between the second fiber splice end and the far end,
   (d) detecting at least a part of the stripped radiation with detection means having an output,
   (e) adjusting the relative position of the fiber splice ends in response to the output of the detection means, and
   (f) splicing the first fiber to the second fiber, characterized in that
   (g) the radiation stripped from the second fiber consists substantially of nonfundamental mode radiation.

2. Method of claim 1, wherein the detected radiation comprises a substantial fraction of lowest nonfundamental mode ($LP_{11}$) radiation, for at least some relative position of the fiber splice ends.

3. Method of claim 2, wherein the detected radiation is at least 90% $LP_{11}$ radiation.

4. Method of claim 1, wherein the radiation is stripped from the second fiber by means comprising fiber bending means.

5. Method of claim 4, wherein the fiber bending means are adapted to producing a fiber bend radius between about 0.4 inches and about 1.5 inches.

6. Method of claim 4, wherein the distance $L_d$ between the second fiber splice end and the point of initial second fiber tangency with the fiber bending means is between about 0.25 and about 10 inches.

7. Method of claim 1, further comprising determining the loss of the splice.

8. Method of claim 7, comprising determining a detector output at the zero offset position and the detector output after changing the relative position of the fiber ends by a known amount from the zero offset position.

9. Apparatus for splicing a first optical fiber to a second optical fiber, the first and the second fibers being single mode optical fibers at a predetermined wavelength, the first and second fibers having a first fiber splice end and a second fiber splice end, respectively, the apparatus comprising
   (a) first fiber holding means and second fiber holding means,
   (b) fiber translation means, whereby the position of the first fiber splice end can be changed relative to the second fiber splice end,
   (c) radiation stripping means for stripping radiation of the predetermined wavelength from the second fiber at a location spaced from the second fiber splice end, and
   (d) radiation detection means having an output, characterized in that
   (e) the radiation stripping means are adapted for stripping, at the predetermined wavelength, substantially only nonfundamental mode radiation from the second fiber.

10. Apparatus of claim 9, wherein the radiation detected by the detection means comprises a substantial fraction of lowest nonfundamental mode ($LP_{11}$) radiation, for at least some relative position of the fiber splice ends.

11. Apparatus of claim 9, wherein the radiation detection means comprise a radiation detector and a phase-sensitive detector.

12. Apparatus of claim 9, wherein the fiber translation means are responsive to the radiation detection means output.

13. A single mode optical fiber comprising a splice between two single mode optical fiber segments, the splice produced by the method of claim 1.

14. Optical fiber of claim 13, wherein the radiation loss due to the splice is less than 0.1 dB at the operating wavelength of the fiber.

* * * * *